US006283535B1

(12) United States Patent
Yuge

(10) Patent No.: US 6,283,535 B1
(45) Date of Patent: Sep. 4, 2001

(54) APPARATUS FOR DRIVING VEHICLE DOOR TO OPEN AND CLOSE

(75) Inventor: Masaaki Yuge, Yokohama (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/639,883

(22) Filed: Aug. 17, 2000

(30) Foreign Application Priority Data

Aug. 20, 1999 (JP) ........................................ 11-234566
Oct. 29, 1999 (JP) ........................................ 11-310366

(51) Int. Cl.$^{7}$ ........................................ B60J 5/10
(52) U.S. Cl. ........................ 296/146.8; 296/146.1; 296/146.8; 296/56; 49/339; 49/340; 49/341; 49/342; 49/343; 49/344
(58) Field of Search ........................ 296/146.1, 146.8, 296/102, 56; 49/339, 340, 341, 342, 343, 344

(56) References Cited

U.S. PATENT DOCUMENTS 5,332,279 * 7/1994 Golemis et al. .................... 49/146.4
5,477,642 * 12/1995 Legendre ............................ 49/340
5,513,467 * 5/1996 Current et al. ...................... 49/340
6,055,775 * 5/2000 Dering et al. ....................... 49/340
6,092,337 * 7/2000 Johnson et al. ..................... 49/340
6,138,412 * 10/2000 Rieckmann et al. ............... 49/340 X
6,142,551 * 11/2000 Ciavaglia et al. ..................... 296/56
6,145,917 * 11/2000 Ishii et al. ........................ 296/146.1

FOREIGN PATENT DOCUMENTS 6-71852 10/1994 (JP) .

* cited by examiner

*Primary Examiner*—D. Glenn Dayoan
*Assistant Examiner*—Lori L. Coletta
(74) *Attorney, Agent, or Firm*—Foley & Lardner

(57) ABSTRACT

A kinetic conversion mechanism includes a driving pulley pivotally connected to one end portion of a board which is pointed in the direction of substantially crossing the hinge shaft of a door, coupled to the output shaft of a motor and capable of forward and reverse rotation; a driven pulley pivotally connected to the other end of the board; and an endless belt wound on the driving pulley and the driven pulley, the belt being coupled to a part of the belt as the output portion thereof. The kinetic conversion mechanism and the motor are arranged in the shape of substantial L-letter by coupling the motor to one end portion of the kinetic conversion mechanism at substantially right angles. A transmission member is made bendable and also pivotal within a plane substantially perpendicular to a hinge shaft. One end of a coupling member is pivotally connected to an open-close structure, whereas the other end thereof is pivotally connected to the transmission member. Further, the coupling member follows the open-close movement of the open-close structure and is caused to tilt while bending the transmission member.

10 Claims, 6 Drawing Sheets

APPARATUS FOR DRIVING VEHICLE DOOR TO OPEN AND CLOSE

BACKGROUND OF THE DISCLOSURE

1. Description of the Invention

The present invention relates to an apparatus for driving a vehicle door such as a back vehicle door to open and close by driving a motor, in other words, a switching apparatus for opening and closing an open-close structure such as the back door vehicle.

The present application is based on Japanese Patent Applications No. Hei. 11-234566 and 11-310366 which are incorporated herein by reference.

2. Description of the Related Art

There exists an apparatus for driving a back door of a station wagon, or a switching apparatus for opening and closing the back door by driving a motor as disclosed in Japanese Utility Model Publication No. Hei. 6-71852, for example.

In the switching apparatus above, the roof of the vehicle body is equipped with a motor, a reduction mechanism provided in parallel to the motor, a segment gear engaging with the pinion gear of the reduction mechanism and rockingly pivotally connected thereto in the horizontal direction to form a transmission member, and a linearly-reciprocating rod pivotally connected to a part separated from the rotational center of the segment gear to form a coupling member. In this case, the rear end portion of the rod is pivotally connected to the vertically opening-closing door so that the door can be opened and closed by rocking the segment gear to move the rod back and forth.

In the conventional apparatus for driving a vehicle door to open and close, however, it is necessary to secure a great deal of space for use in providing the rod in the vehicular roof because the segment gear is moved along the roof surface so as to linearly rock the rod back and forth. Consequently, the problem lies in the fact that the interior room space needs decreasing in consideration of head clearance intended for anyone sitting in the rear seat.

Further, in the conventional switching apparatus, a ball joint is used for coupling the front end portion of the rod to the segment gear so that the rod can vertically tilt round the front end portion thereof coupled to the segment gear as the door opens or closes. Consequently, the way of coupling the rod to the segment gear tends to become complicated and this will result in an increase in costs.

SUMMARY OF THE INVENTION

An object of the present invention made in view of the foregoing problems is to provide an apparatus for driving a vehicle door to open and close such that the apparatus therefor can be placed in a limited and narrow installation space whereby to prevent the interior car room space from being reduced.

Another object of the present invention made in view of the foregoing problems is to provide an apparatus for switching a vehicular open-close structure, which apparatus is designed to reduce costs by coupling the transmission member of a driving unit to a coupling member in a simply way.

According to the present invention, the foregoing problems can be solved as follows:

In an apparatus for driving a vehicle door to open and close, a coupling member is used for coupling the output portion of a kinetic conversion mechanism for converting the torque of a motor fitted to a vehicle body into a linear motion and outputting the linear motion to a door pivotally connected to the vehicle body with a hinge shaft so that the door can be opened and closed via the kinetic conversion mechanism and the coupling member by making use of the torque of the motor, the kinetic conversion mechanism including a driving pulley pivotally connected to one end portion of a board which is pointed in the direction of substantially crossing the hinge shaft, coupled to the output shaft of the motor and capable of forward and reverse rotation; a driven pulley pivotally connected to the other end of the board; and an endless transmission member wound on the driving pulley and the driven pulley, wherein the coupling member is coupled to a part of the transmission member as the output portion thereof; and the kinetic conversion mechanism and the motor are arranged in the shape of substantial L-letter by coupling the motor to one end portion of the kinetic conversion mechanism at substantially right angles.

The motor may be coupled to the close-to-the-door-side end portion of the kinetic conversion mechanism.

The wound transmission member may be composed of a belt.

The motor and the kinetic conversion mechanism may be arranged along the edge of the vehicular roof in one corner portion thereof.

The kinetic conversion mechanism and the motor may be arranged along the corner portion of a window on the side of the vehicle.

In an apparatus for switching a vehicular open-close structure, a coupling member is used for coupling the transmission member of an output mechanism for converting the torque of a motor fitted to a vehicle body into a linear motion and outputting the linear motion to a portion parted from the hinge shaft of the open-close structure pivotally connected to the vehicle body with the hinge shaft so that the open-close structure can be opened and closed via the transmission member and the coupling member by making use of the torque of the motor, wherein the transmission member is made bendable and also pivotal within a plane substantially perpendicular to the hinge shaft; one end of the coupling member is pivotally connected to the open-close structure, whereas the other end thereof is pivotally connected to the transmission member; and the coupling member follows the open-close movement of the open-close structure and is caused to tilt while bending the transmission member.

The output mechanism may be formed with an endless transmission member wound on a driving pulley which is journaled onto one end portion of a board directed in a direction substantially perpendicular to the hinge shaft and capable of forward and reverse rotation as the motor rotates, and a driven pulley pivotally connected to the other end portion of the board.

The transmission member may be made of a belt of elastic flat rubber.

A coupling portion in contact with and joined to the flat face of the belt may be formed in the other end portion of the coupling member.

Both ends of the belt may be joined to the other end portion of the coupling member to make the belt endless.

Features and advantages of the invention will be evident from the following detailed description of the preferred embodiments described in conjunction with the attached drawings.

DETAILED DESCRIPTION OF THE PREFERRED EMBODIMENTS

Figure 1:
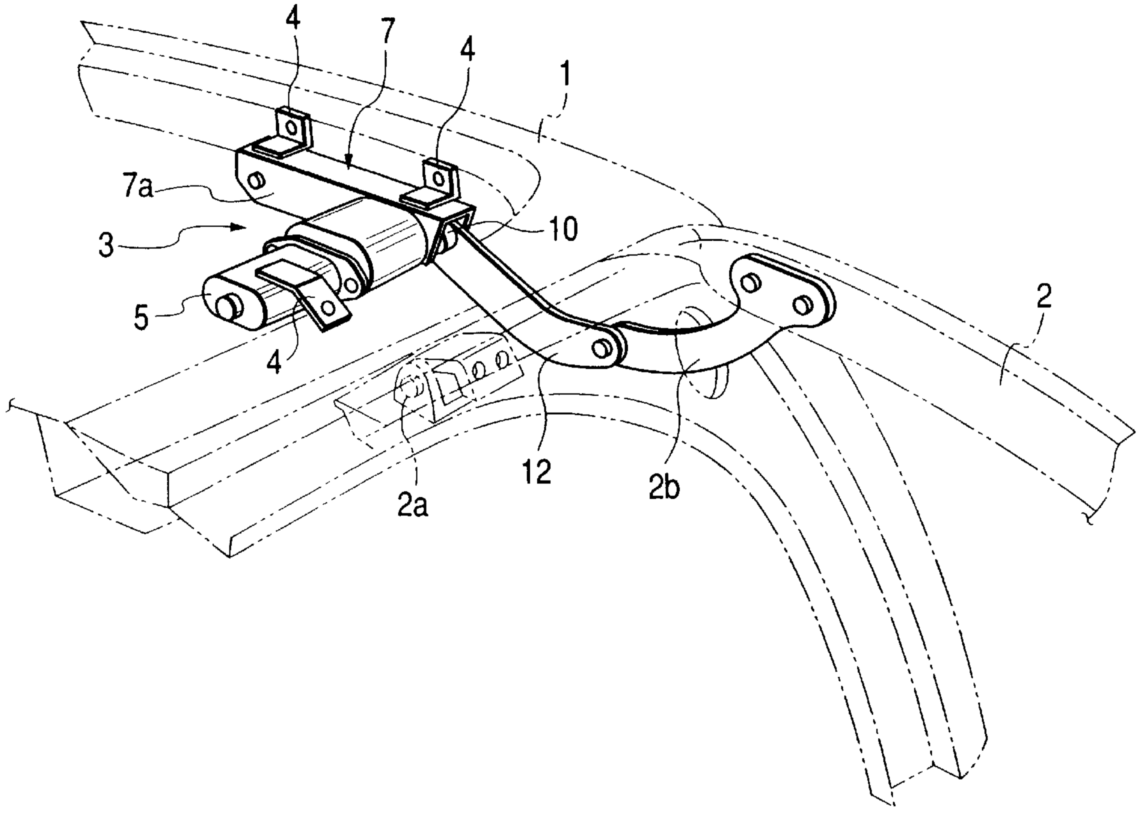
FIG. 1 shows a schematic perspective view of the principal part of a first embodiment of the invention.

Referring to FIGS. 1 to 5, there will be shown a first embodiment of the present invention.

As shown in the drawings, the embodiment of the invention comprises a vehicular roof 1, a back door 2 pivotally connected to the rear end portion of the roof 1 with a hinge shaft 2*a* set in the width direction of a vehicle and used for opening and losing the rear end door 2 of the vehicle, and a driving unit fixed to the inside of the roof panel in the rear of the roof 1 with a plurality of fitting brackets 4 and coupled to the door 2. The door 2 is opened and closed by turning on a switch (not shown) disposed near the driver's seat of the vehicle or near the door 2 so as to supply power thereto.

The driving unit 3 includes a motor 5 wherein an output shaft 5*a* capable of forward and reverse rotation is disposed in substantially parallel to the hinge shaft 2*a*, a reduction mechanism 6 having a plurality of spur gears 6*a* and 6*b* for reducing the rotation of the output shaft 5*a* by engaging with a pinion 5*b* secured to the output shaft 5*a* of the motor 5, and a kinetic conversion mechanism 7 having a board 7*a* whose longer direction is substantially perpendicular to the axis of the hinge shaft 2*a*, the motor 5 being substantially perpendicularly coupled to the close-to-the-door-side end portion of the kinetic conversion mechanism 7.

Figure 4:
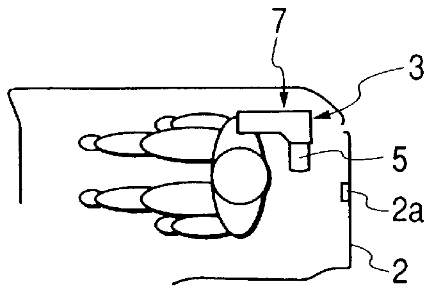
FIG. 4 shows a schematic plan view of the rear portion of a vehicle.
Figure 5:
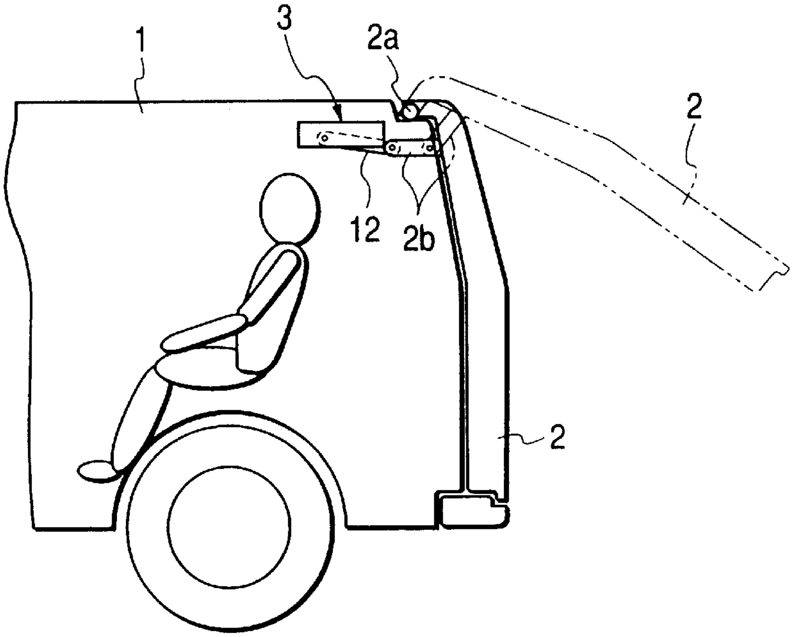
FIG. 5 shows a schematic side view of the rear portion of the vehicle.

The motor 5 and the kinetic conversion mechanism 7 are fitted to the roof 1 in the shape of substantial L-letter as viewed from above. As shown in FIG. 4, the motor 5 and the kinetic conversion mechanism 7 are placed along the rear and side edges of the roof 1 in the rear corner portion of the roof 1 in such a position as to keep away from the head of a person sitting in the rear seat so that the head clearance of the person in the rear seat ay not be reduced.

Figure 2:
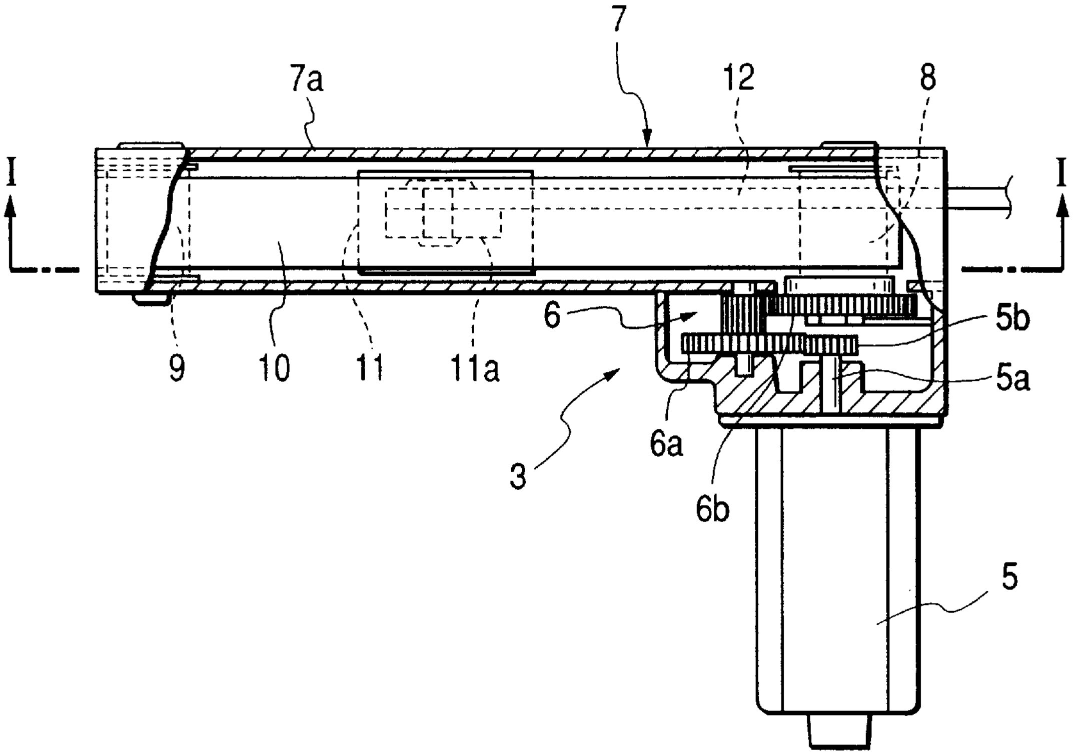
FIG. 2 shows a partial cutaway plan view of the principal part of a driving unit.
Figure 3:
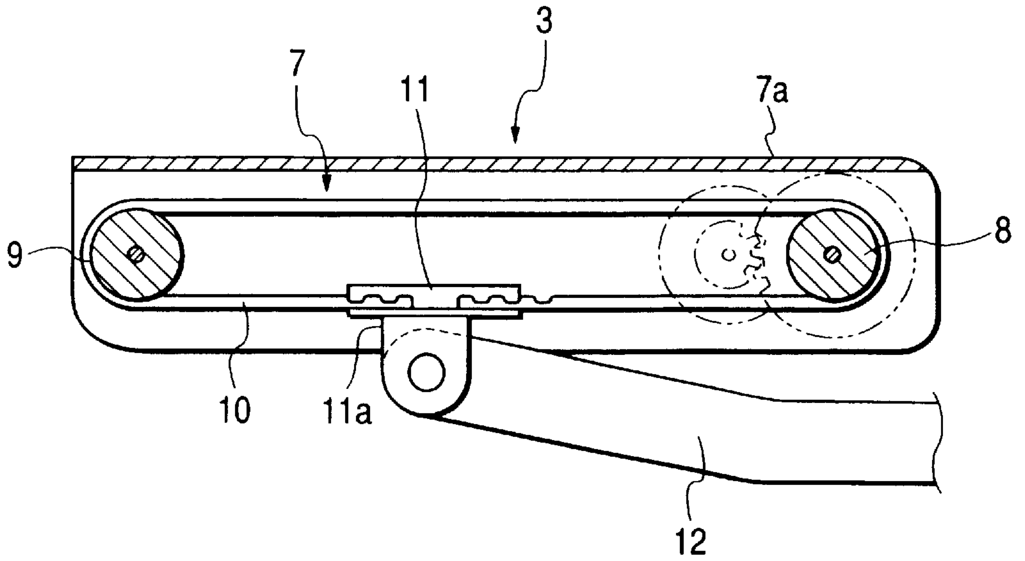
FIG. 3 shows a sectional view taken on line I—I of FIG. 2.

As shown in FIGS. 2 and 3, the kinetic conversion mechanism 7 is formed integrally with the spur gear 6*b* of the reduction mechanism 6 and includes a driving pulley 8 pivotally connected to one end portion of the board 7*a*, a driven pulley 9 pivotally connected to the other end portion of the board 7*a*, an endless belt 10 formed of flexible material such as rubber that is a transmission member wound about the driving pulley 8 and the driven pulley 9, and a connection metal part 11 for connecting the ends of the belt 10 together. The connection metal part 11 is allowed to linearly move with the belt 10 between the driving pulley 8 and the driven pulley 9 and forms the output portion of the kinetic conversion mechanism 7. The front end portion of a link 12 as a coupling member with the door 2 is coupled to a fitting flap 11*a* hanging down from the underside of the connection metal part 11. The rear end portion of the link 12 is pivotally connected to a bracket 2b secured to the upper front of the door 2.

The wound transmission member 10 is not limited to the rubber belt 10 but may be a plastic belt, a belt with teeth engaging with the teeth formed on the outer peripheral face of the driving pulley 8, the teeth of the belt being formed on the side on which each pulley is wound, or a metal or plastic chain or cable.

The operation of the apparatus thus configured for driving a vehicle door to open and close will now be described. When the door 2 is in the closed position as shown by a solid line of FIG. 5, the connection metal part 11 is positioned in the front end portion of the kinetic conversion mechanism 7. When the driving pulley 8 is rotated counterclockwise in FIG. 3 via the reduction mechanism 6 by rotating the motor 5 in a predetermined direction using an operating switch, the connection metal part 11 is moved backward via the belt 10 and the door 2 is pushed backward via the link 12. Thus, the door 2 is pivoted on the hinge shaft 2*a* toward the open position as shown by an imaginary line of FIG. 5.

When the door 2 is in the open position, moreover, the driving pulley 8 and the belt 10 are reversed by rotating the motor 5 in the reverse direction using the operating switch. Then the connection metal part 11 is moved forward and the door 2 is drawn forward via the link 12 before being moved to the closed position.

Figure 6:
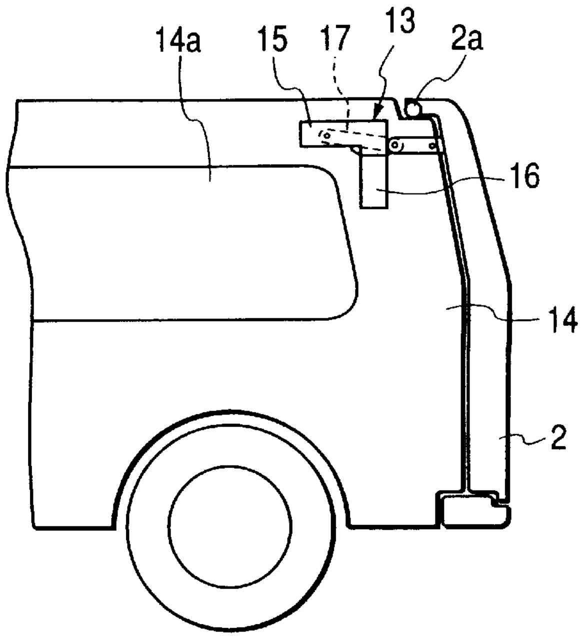
FIG. 6 shows a schematic side view of the rear portion of a vehicle in a second embodiment of the invention.

FIG. 6 shows a second embodiment of the invention wherein a driving unit 13 is disposed within a panel near the window 14*a* of the side panel of a vehicle body. A kinetic conversion mechanism 15 whose longer direction crosses the hinge shaft 2*a* at substantially right angles so that the kinetic conversion mechanism 15 may be directed longitudinally along the upper edge of the window 14*a*.

A motor 16 hanging down from the close-to-door-side end portion of the kinetic conversion mechanism 15 and the kinetic conversion mechanism 15 are fitted to the vehicle in the shape of substantial L-letter in side view. The kinetic conversion mechanism 15 is similar in construction to what is shown in the preceding embodiment of the invention and coupled to the door 2 in the rear via a link 17. The motor 16 and the kinetic conversion mechanism 15 may be arranged along the corner portion of the window 14a of the side panel 14 according to this embodiment of the invention.

A third embodiment of the invention will now be described with reference to FIGS. 7 to 11.

Figure 9:
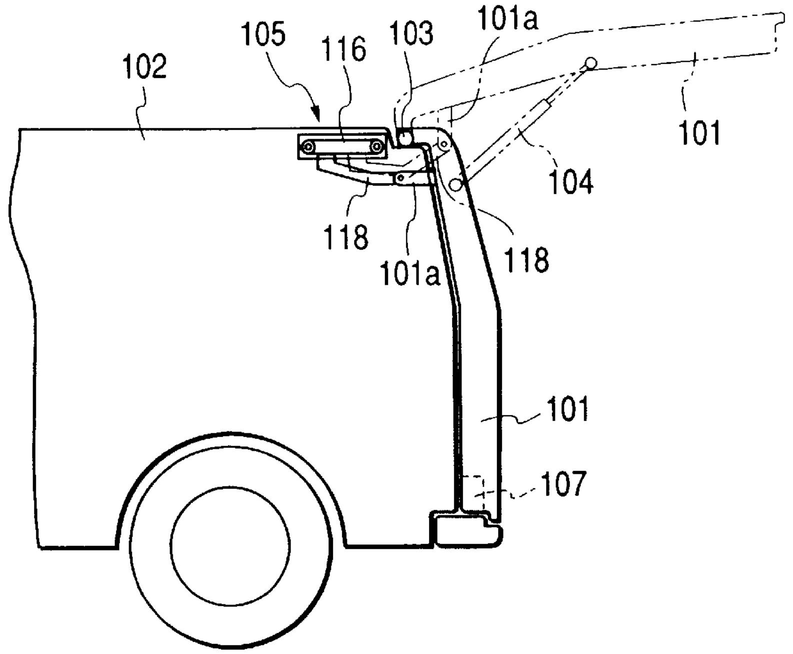
FIG. 9 shows a schematic side view of a rear vehicle portion.
Figure 10:
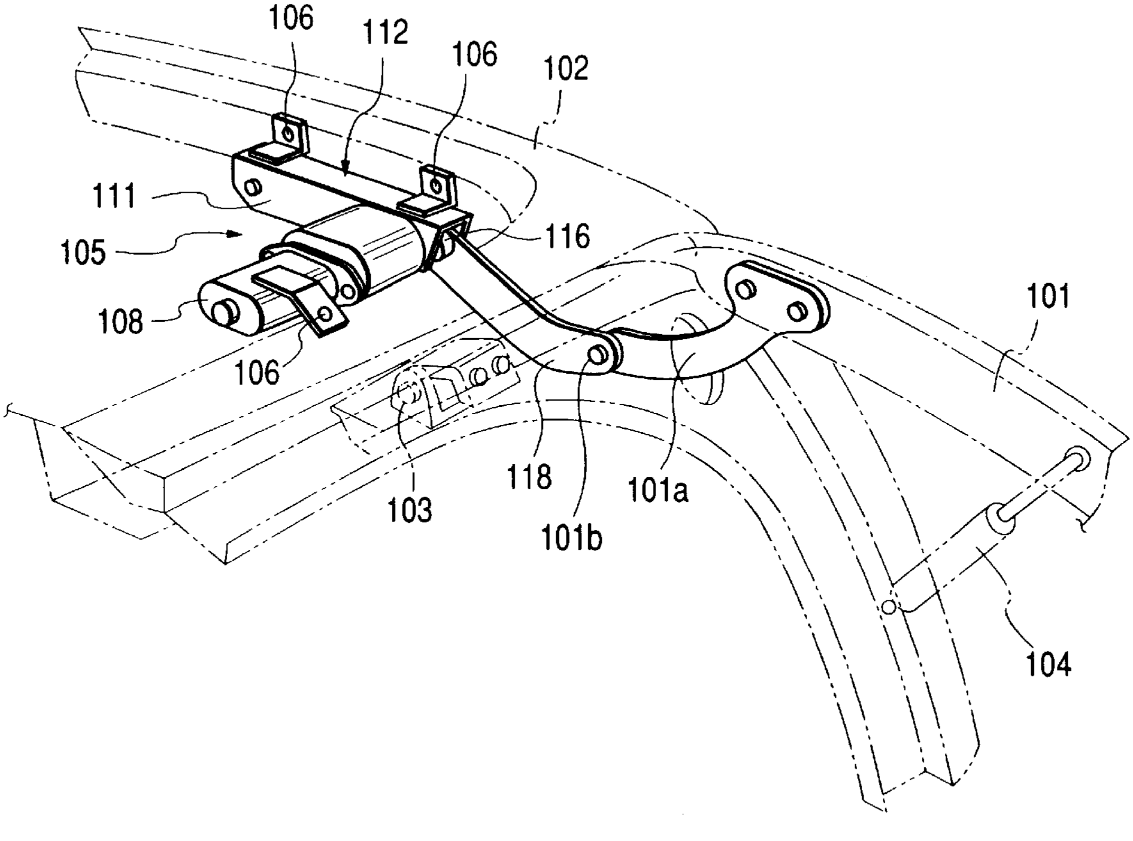
FIG. 10 shows a perspective view of a state wherein the driving unit has been installed.
Figure 11:
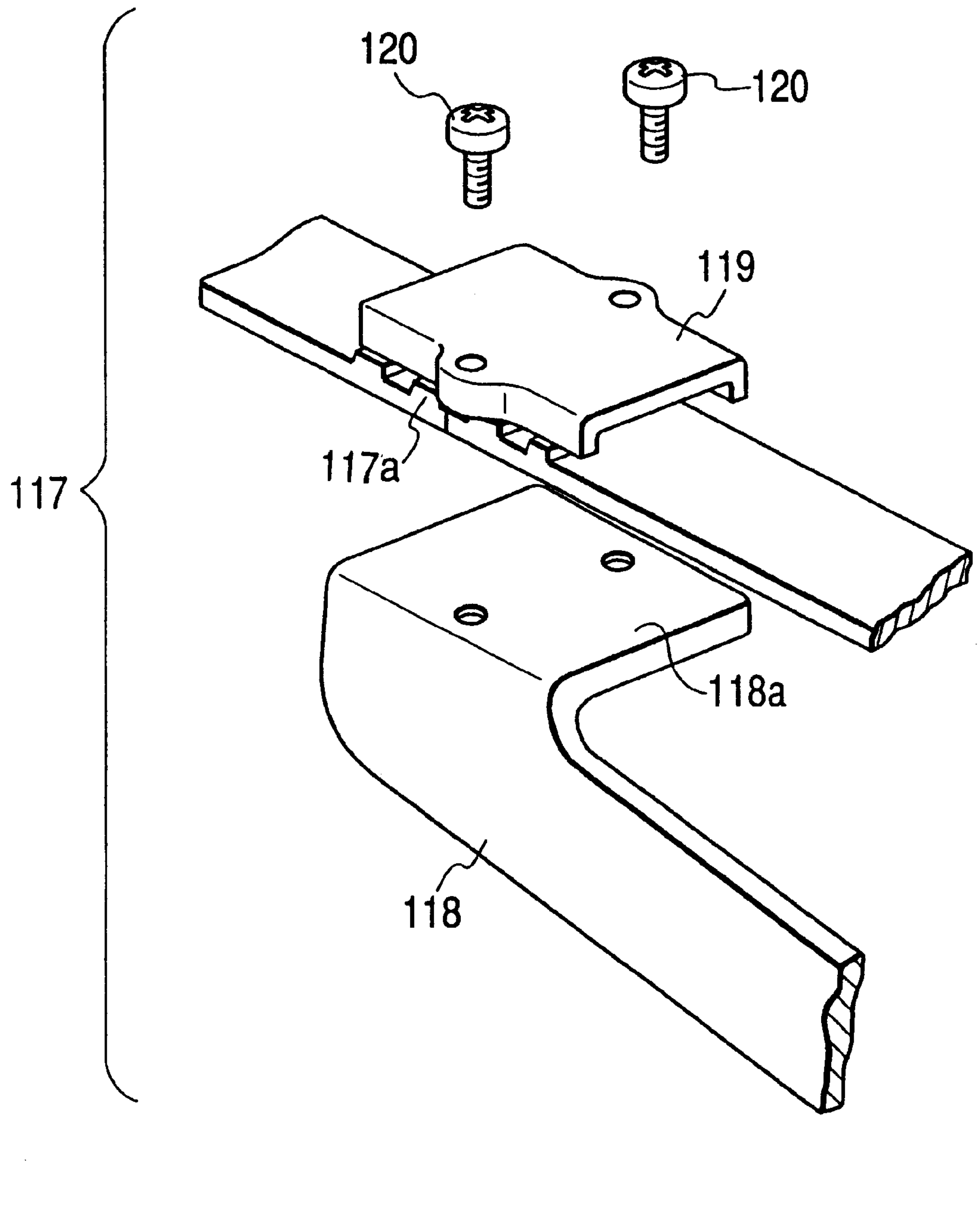
FIG. 11 shows an exploded perspective view of the joint between a coupling member and a transmission member.

In FIGS. 9 and 10, reference numeral 101 denote a back door as an open-close structure for use in opening and closing the rear end opening of a vehicle body, which door is pivotally connected to the rear end portion of a vehicular roof 102 of such a station wagon so that the door can be vertically opened and closed with a laterally-directed hinge shaft 103; 104, a gas stay flexibly provided between the door 101 and the vehicle body and capable of holding the door 101 in a full-open position by giving the door 101 an urging force toward the opening of the door.

Reference numeral 105 denotes a driving unit fixed to the inside of the rear end portion of the roof 102 with a fitting bracket 106, couple to the door 101 via a link 118, which will be described later, and used to automatically open and close the door 101 by operating a switch (not shown) to supply power thereto.

A door lock 107 for keeping the door 101 in a full-close condition by engaging with a striker (not shown) secured to the vehicle body side is fitted to the center of the lower end portion of the door 101.

Figure 7:
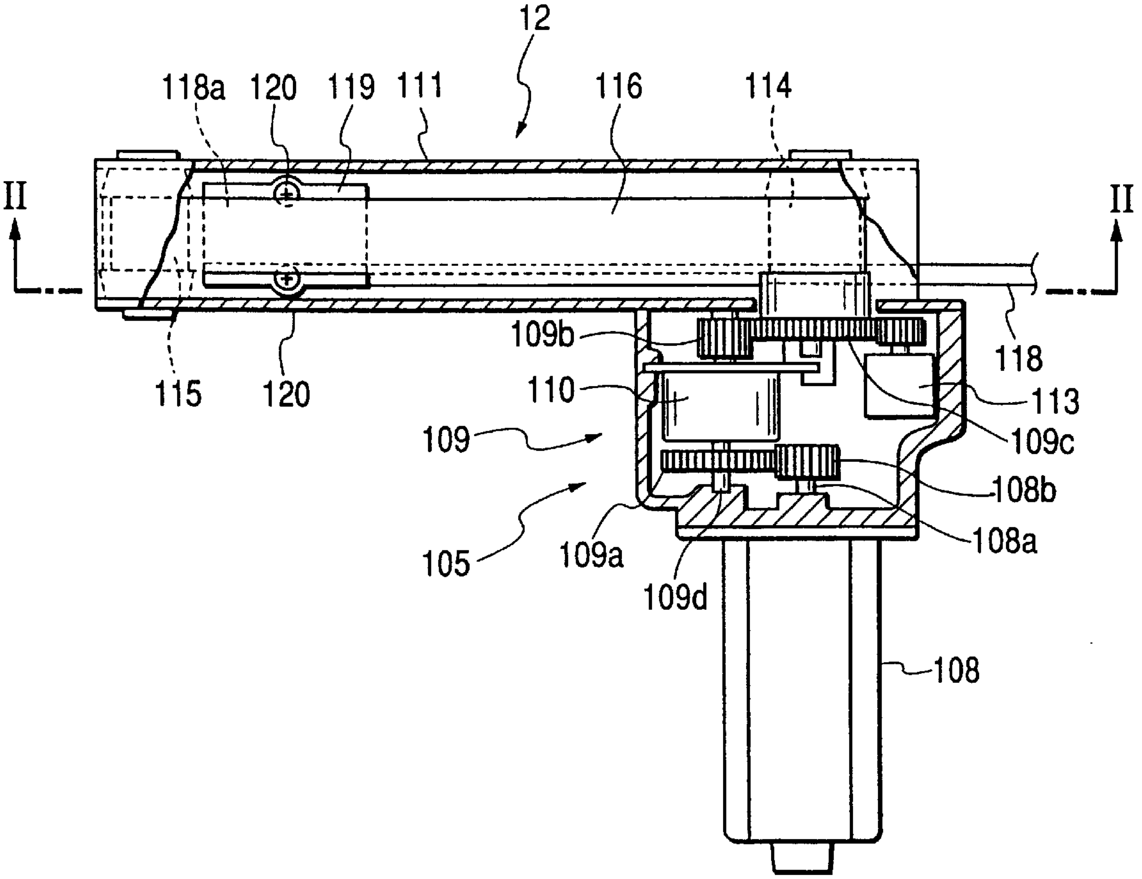
FIG. 7 shows a partial cutaway plan view of the principal part of a driving unit of a third embodiment of the invention.

As particularly shown in FIG. 7, the driving unit 105 includes a motor 108 wherein an output shaft 108*a* capable of forward and reverse rotation is disposed in substantially parallel to the hinge shaft 103, and a reduction mechanism 109 having a large-diameter gear 109*a* engaging with a pinion 108*b* secured to the output shaft 108*a* of the motor 108, and a large-diameter gear 109*c* engaging with an output-side pinion 109*b* coaxial with the shaft 109*d* of the large-diameter gear 109*a*. The driving unit 105 further includes an electromagnetic clutch 110 disposed between the large-diameter gear 109*a* and the shaft 109*d* and used for linking the large-diameter gear 109*a* and the pinion 109*b* together and cutting the linkage therebetween, and an output mechanism 112 coupled to the rear end portion of a longitudinal board 111 and used for converting the torque transmitted from the motor 108 via the reduction mechanism 109 into a linear motion. The motor 108 and the output mechanism 112 are fitted to the roof 102 in the shape of substantial L-letter as viewed from above.

Further, a rotary encoder 113 is capable of forward and reverse rotation by engaging with the large-diameter gear 109*c* for the purpose of measuring the angle of rotation, and makes known the amount and direction of the movement of the door 101 using the pulse signal generated as it rotates.

The clutch 110 normally cuts the linkage between the motor 108 and the large-diameter gear 109*c* and establishes the linkage therebetween when the operating switch is turned on to supply power.

Figure 8:
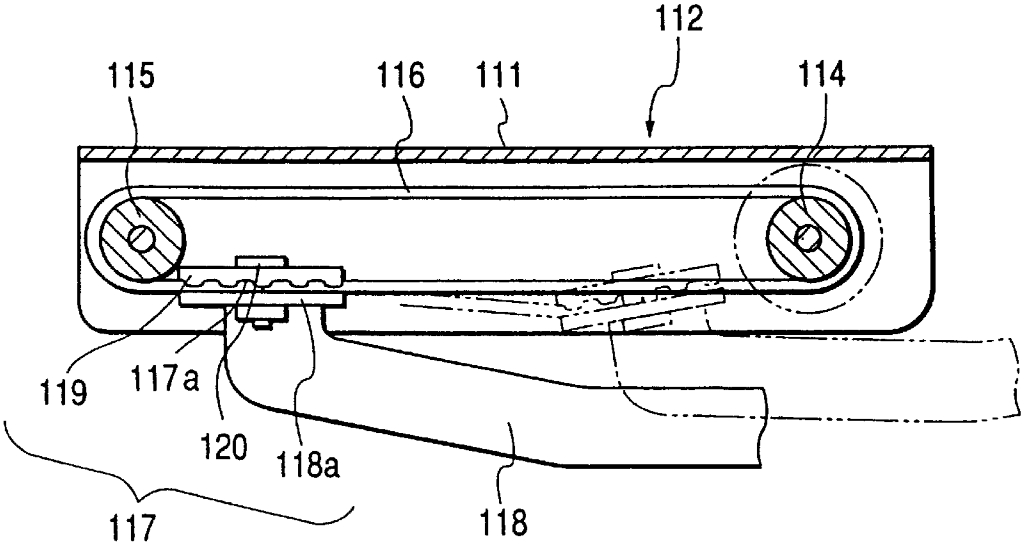
FIG. 8 shows a sectional view taken on line II—II of FIG. 7.

As particularly shown in FIG. 8, the output mechanism 112 a driving pulley 114 coupled integrally with the large-diameter gear 109*c*, pivotally supported by the rear end portion of the board 111 in a manner capable of forward and reverse rotation and laterally directed, a driven pulley 115 axially supported by the front end portion of the board 111 and laterally directed, and a flat belt 116 as an endless elastic, bendable transmission member such as rubber wound on the driving pulley 114 and the driven pulley 115.

The belt 116 is formed by abutting both its ends against each other in the lower travel passage and joining the ends together with a connection metal part 119, which will be described below, and the joint between both the ends forms an output portion 117.

The front end portion of the link 118 as a longitudinally-directed coupling member is joined to the output portion 117. A coupling portion 118*a* bent along the underside of the belt 116 is formed in the front end portion of the link 118. The coupling portion 118*a* and the connection metal part 119 engaging with the unevenness 117*a* formed inside both the end portions of the belt 116 are used to vertically clamp the belt 116. The coupling portion 118*a* of the link 118 is joined to the output portion 117 by clamping the coupling portion 118*a* and the connection metal part 119 with a clamping screw 120 so that the coupling portion 118*a* thereof together with the belt 116 is made longitudinally movable between the driving pulley 114 and the driven pulley 115.

The rear end portion of the link 118 is pivotally connected via a laterally-directed shaft 101*b* to a fitting bracket 101*a* secured to the upper front of the link 118 slightly separated from the hinge shaft 103 in the door 101.

The belt 116 is capable of elastic deformation allowing the link 118 to vertically tilt by making the belt 116 slightly meander in front and in the rear of the output portion 117, that is, forming a belt having an uneven surface as viewed from its side. More specifically, the link 118 is allowed to slightly vertically tilt round the coupling portion 118*a*.

The transmission member is not limited to the rubber belt 116 capable of elastic deformation but may be a plastic belt, a belt with teeth engaging with the teeth formed on the outer peripheral face of the driving pulley, or a metal or plastic chain or cable. In this case, the belt is loosen to the extent that the tilting motion of the link 118 can be absorbed before being wound on the front and rear pulleys.

The operation of the apparatus thus configured for switching the vehicular open-close structure will now be described.

When the door 101 is in the closed position as shown by a solid line of FIG. 9, the coupling portion 118*a* of the link 118 is position in front of the output mechanism 112 as shown by a solid line of FIG. 8. In this closed state, the coupling portion 118*a* of the link 118 is free from tilting motion as shown in the drawing.

When the operating switch is turned on, the door lock 107 is released by an actuator (not shown) from engaging with the striker. Then the clutch 110 is brought into the engaged condition and the forward operation of the motor 108 is started so as to rotate the driving pulley 114 counterclockwise via the reduction mechanism 109 and the clutch 110, whereby the door 101 is pushed back via the link 118 and pivoted upward on the hinge shaft 103 toward the full-open position shown by an imaginary line of FIG. 9.

Then the link 118 follows in the direction of opening the door 101 and moves to the rear of the board 111. At this time, the coupling portion 118*a* tilts as shown by an imaginary line of FIG. 8 while bending and pivoting the belt 116 upward.

When the operating switch is turned off with the door 101 held in the full-open position by the gas stay 104, the clutch 110 is engaged and the motor 108 is rotated reversely to reverse the driving pulley 114 and the belt 116. Further, the link 118 is moved forward from the position shown by the imaginary line of FIG. 8 and the door 101 is drawn forward via the link 118 before being moved to the closed position. At this time, the link 118 pivots downward while loosening the bending of the belt 116 and returns to the original position.

According to the present invention, the following effect is achievable.

The kinetic conversion mechanism can be made compact and since the kinetic conversion mechanism and the motor can be fitted to the vehicle body in the shape of substantial L-letter, they can be arranged efficiently in a limited space, so that a decrease in the room space is minimized.

The motor and the kinetic conversion mechanism are placeable in such a position as to keep away from the head of a person sitting in the rear seat so that the head clearance of the person may not be reduced.

The motor and the kinetic conversion mechanism placeable efficiently even in a narrow space since they can be disposed along the corner portion of the window.

The coupling member is directed joined to the transmission member, and the tilting of the coupling member as the open-close structure opens or closes is absorbed by the transmission member, whereby the transmission member can be coupled to the coupling member in a simple way without using expensive parts such as a ball joint; this result in a decrease in costs.

The coupling member can easily be tilted as the driving pulley and the driven pulley are readily bent.

The coupling member can be joined to the transmission member without joint looseness as the tilting of the link can be absorbed by the deformation of the transmission member.

The durability of the joint can be improved as the coupling member is certainly joined to the transmission member.

Aassembly work is facilitated as joining of ends of the belt as-well as the coupling of the belt and the coupling member can be accomplished by a single joining means at the same place.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An apparatus comprising:

a motor adapted to be fitted to a vehicle body;

a kinetic conversion mechanism for converting a torque of said motor into a linear motion to thereby output the linear motion;

a coupling member adapted for coupling an output portion of said kinetic conversion mechanism to a vehicle door pivotally connected to the vehicle body with a hinge shaft, so that the vehicle door can be opened and closed via said kinetic conversion mechanism and said coupling member by the torque of said motor, wherein said kinetic conversion mechanism comprises:

a driving pulley pivotally connected to one end portion of a board which is pointed in a direction substantially crossing said hinge shaft, coupled to the output shaft of said motor and capable of forward and reverse rotation;

a driven pulley pivotally connected to the other end of said board; and an endless transmission member wound on said driving pulley and said driven pulley, wherein said coupling member is coupled to a part of the endless transmission member as the output portion thereof, wherein said kinetic conversion mechanism and said motor are arranged in an L-shape by coupling motor to one end portion of said kinetic conversion mechanism at substantially right angle.

2. An apparatus for driving a vehicle door to open and close according to claim 1, wherein said motor is coupled to one end portion of said kinetic conversion mechanism adjacent to the vehicle door.

3. An apparatus for driving a vehicle door to open and close according to claim 1, wherein said wound transmission member is a belt.

4. An apparatus for driving a vehicle door to open and close according to claim 1, wherein said motor and said kinetic conversion mechanism are adapted for disposition along an edge of a vehicle roof at one corner portion thereof.

5. An apparatus for driving a vehicle door to open and close according to claim 1, wherein said kinetic conversion mechanism and said motor are adapted for disposition along a corner portion of a window on a side of a vehicle body.

6. An apparatus for switching a vehicular open-close structure, comprising:

a motor adpated to be fitted to a vehicle body;

an output mechanism for converting a torque of the motor into a linear motion to thereby output the linear motion;

a coupling member adapted for coupling a transmission member of said output mechanism to a portion parted from a hinge shaft of the open-close structure pivotally connected to the vehicle body with the hinge shaft so that the open-close structure can be opened and closed via said transmission member and said coupling member by the torque of said motor, wherein said transmission member is bendable and pivotal within a plane substantially perpendicular to the hinge shaft, one end of said coupling member is pivotally connected to said open-close structure, another end thereof is pivotally connected to said transmission member, and said coupling member follows an open-close movement of said open-close structure and is caused to tilt while bending said transmission member.

7. An apparatus for switching a vehicular open-close structure according to claim 6, wherein the output mechanism comprises:

a driving pulley;

an endless transmission member wound on the driving pulley which is journaled onto one end portion of a board directed in a direction substantially perpendicular to said hinge shaft and capable of forward and reverse rotation as said motor rotates; and a driven pulley pivotally connected to the other end portion of said board.

8. An apparatus for switching a vehicular open-close structure according to claim 7, wherein said transmission member comprises a belt of elastic flat rubber.

9. An apparatus for switching a vehicular open-close structure according to claim 8, wherein a coupling portion in contact with and joined to a flat face of the belt is formed in the other end portion of said coupling member.

10. An apparatus for switching a vehicular open-close structure according to claim 7, wherein both ends of said belt are joined to the other end portion of said coupling member to make said belt endless.

* * * * *